United States Patent [19]

Nix et al.

[11] 4,181,349
[45] Jan. 1, 1980

[54] TRUCK BED LINER

[76] Inventors: Edwin L. Nix, 733 Tahlena Ave.;
Bobby E. Davenport, 317 Beckley Dr., both of Madison, Tenn. 37115

[21] Appl. No.: 929,738

[22] Filed: Jul. 31, 1978

Related U.S. Application Data

[63] Continuation of Ser. No. 769,580, Feb. 17, 1977, Pat. No. 4,111,481.

[51] Int. Cl.² .............................................. B62D 33/02
[52] U.S. Cl. ..................................... 296/39 R; 296/50
[58] Field of Search ................................ 296/39 R, 50

[56] References Cited

U.S. PATENT DOCUMENTS

| 3,418,005 | 12/1968 | Allina | 296/39 R |
|---|---|---|---|
| 3,814,473 | 6/1974 | Lorenzen | 296/39 R |
| 3,881,768 | 5/1975 | Nix | 296/39 R |
| 4,047,749 | 9/1977 | Lambitz et al. | 296/39 R |

Primary Examiner—Richard A. Bertsch
Attorney, Agent, or Firm—Harrington A. Lackey

[57] ABSTRACT

A truck bed liner comprising a tailgate liner having top and bottom hook-shaped flanges adapted to conform to and receive the top and bottom edge surfaces of the tailgate of a truck bed so that the tailgate liner may be snap-fastened to cover the interior surface of the tailgate, without any separate or independent fastener members.

The truck bed liner also includes transversely spaced longitudinal rib members having widthwise dimensions greater than the width of any longitudinal rib members on the bottom wall of a truck bed, to provide longitudinal ventilation spaces between the bottom wall of the truck bed liner and the bottom wall of the truck bed.

6 Claims, 7 Drawing Figures

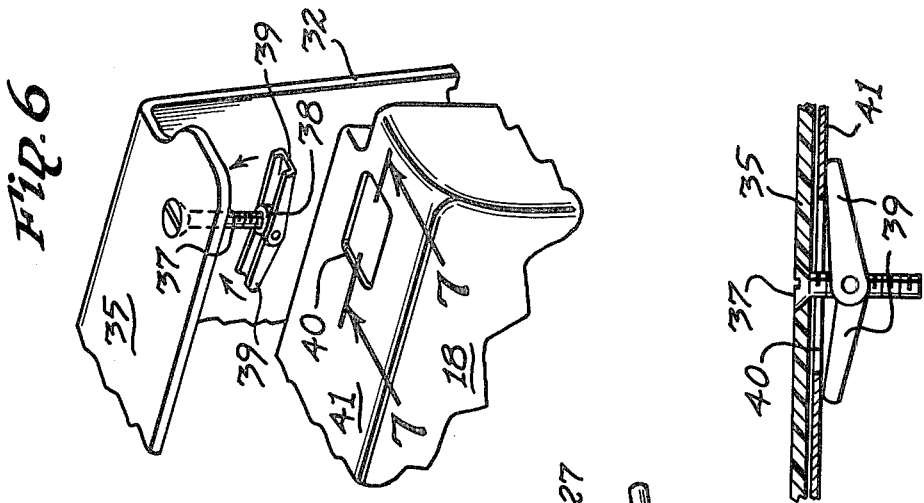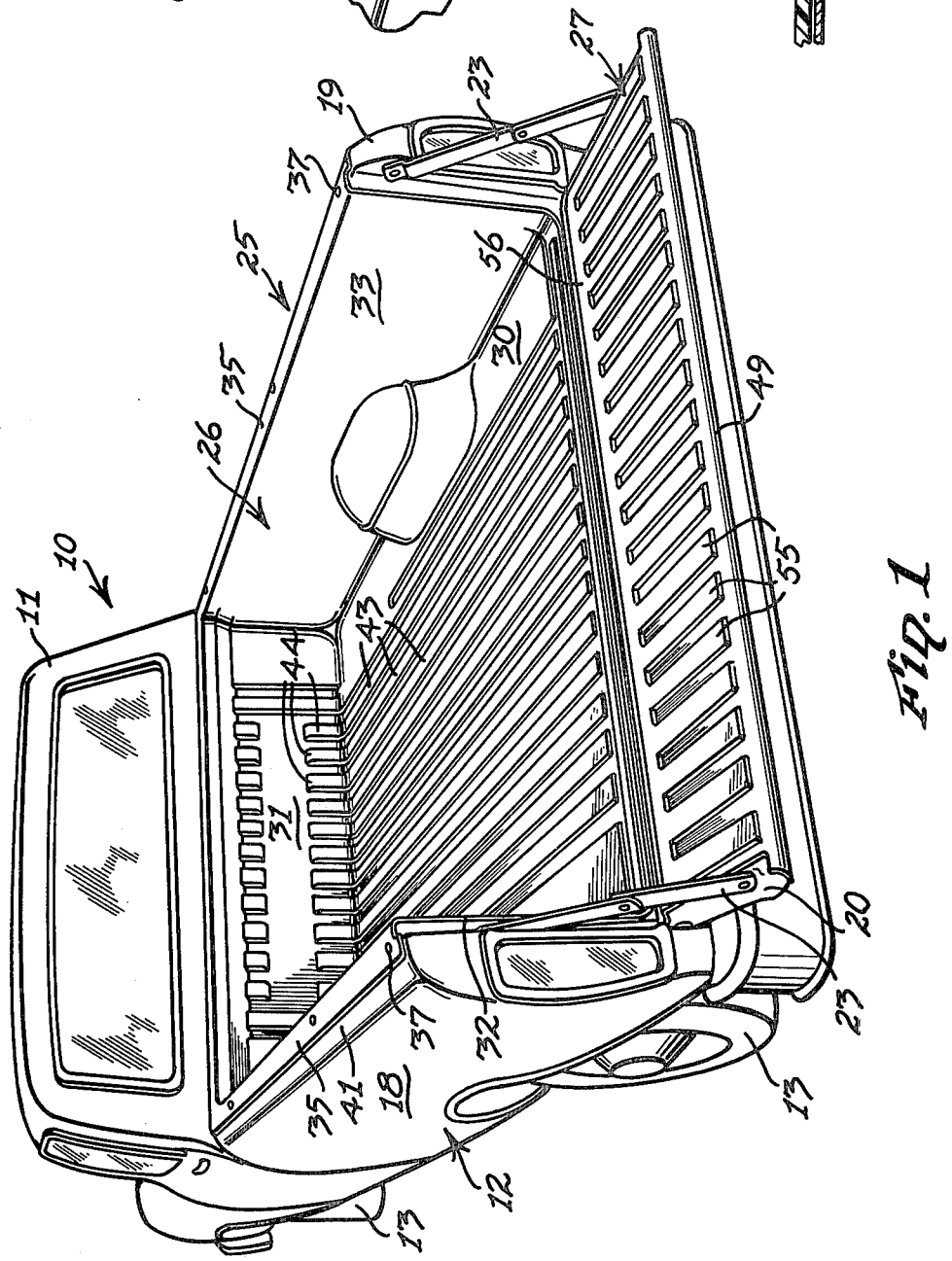

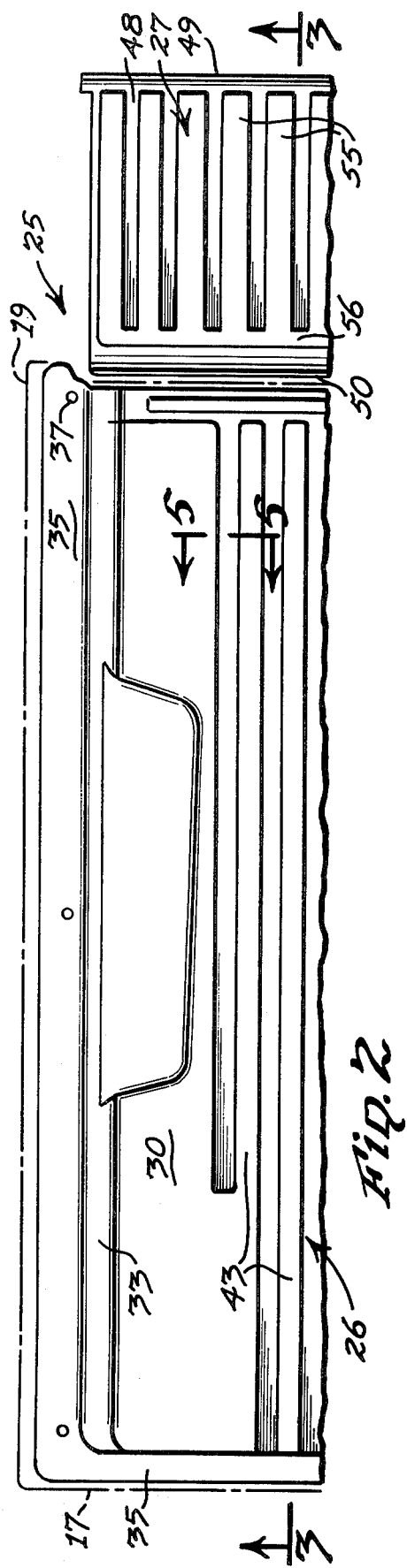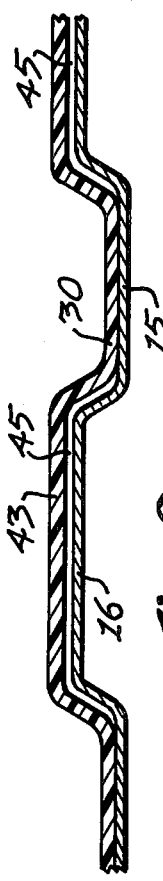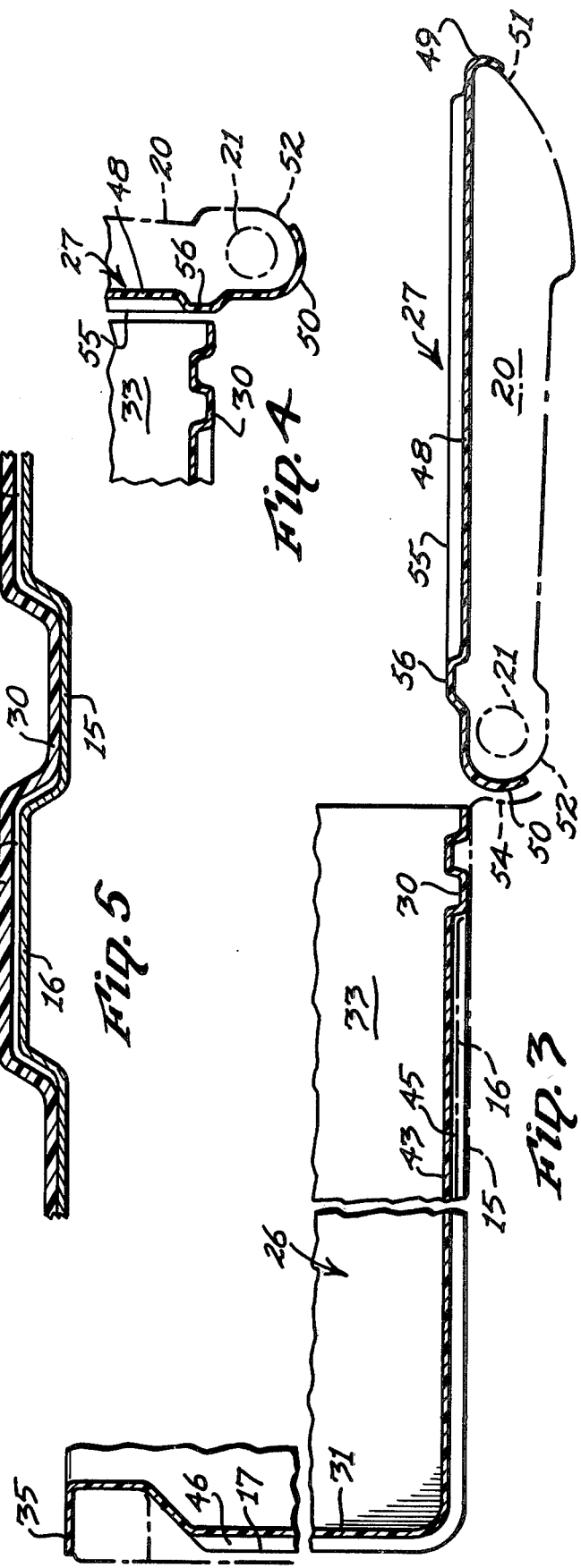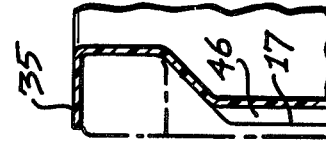

TRUCK BED LINER

CROSS REFERENCE TO RELATED APPLICATION

This application is a continuation of the original patent application Ser. No. 769,580, filed Feb. 17, 1977, now issued as U.S. Pat. No. 4,111,481, issued Sept. 5, 1978.

BACKGROUND OF THE INVENTION

Molded plastic truck bed liners are known in the art as evidenced by the Lorenzen U.S. Pat. No. 3,814,473, issued June 4, 1974, and the Nix U.S. Pat. No. 3,881,768, issued May 6, 1975.

However, difficulties have been experienced in molding a unitary plastic truck bed liner including an integral tailgate liner as illustrated in the Nix U.S. Pat. No. 3,881,768. Furthermore, where the tailgate liner is made independent and separate from the rest of the truck bed liner, separate and independent fastener members, such as screws, bolts or rivets, must be provided, not only for securing the bed liner per se to the truck bed, but also for securing the tailgate liner to the tailgate.

Furthermore, where the truck bed liner is molded to completely conform to the corresponding interior surfaces of the walls of the truck bed, any condensation between the liner walls and the walls of the truck bed is trapped, causing condensation, rusting and corrosion.

SUMMARY OF THE INVENTION

It is therefore an object of this invention to provide a truck bed liner comprising, or including, a separate tailgate liner which is adapted to be easily secured to the tailgate without any instruments, tools or fasteners, other than the inherent construction of the tailgate liner itself for securing the tailgate liner to the tailgate.

Furthermore, it is an object of this invention to provide a truck bed liner having longitudinal ridge members formed in the bottom wall of the liner of slightly greater width than any longitudinal rib member which might be formed on the bottom wall of the truck bed, so that the ridge members form open ventilation channels or spaces longitudinally of the truck bed between the bottom wall of the liner and the bottom wall of the truck bed.

The truck bed liner made in accordance with this invention includes a tailgate liner molded from a unitary, semirigid, high-impact resistant, styrene plastic material in which hook-shaped flanges projecting rearward are formed along the top and bottom longitudinal edge portions of the tailgate liner. These hook-shaped flanges are adapted to conform to and receive the corresponding top and bottom edge surfaces of the tailgate. The hook-shaped flanges are adapted to extend rearward across and slightly turned behind the corresponding top and bottom edge surfaces of the tailgate, so that when either of the top or bottom flanges is fitted over the corresponding edge surface, the other flange may be snap-fitted over its corresponding edge surface to firmly secure the tailgate liner to the tailgate and to completely cover and protect the interior surface of the tailgate, without any additional tools or fasteners.

In a preferred form of the invention, the tailgate liner is provided with longitudinally spaced, transversely extending, rib members to lend rigidity and strength to the tailgate liner, and to improve the resistance of the tailgate liner to impact by objects striking the tailgate liner with great force or weight.

Also in a preferred form of the invention, a longitudinal rib member is formed along the lower edge portion of the tailgate liner to project forward in opposed and proximate relationship to the rear edge of the bottom wall of the truck bed, when the tailgate is closed, to provide a closer fit between the tailgate liner and truck bed or the truck bed liner, and also to improve the rigidity, strength and impact resistance of the tailgate liner.

BRIEF DESCRIPTION OF THE DRAWINGS

FIG. 1 is a rear perspective view of a conventional pick-up truck and a truck bed liner mounted in operative position within the bed of the pick-up truck, with the tailgate in open position;

FIG. 2 is a fragmentary, top plan view of the right-hand portion of the truck bed liner disclosed in FIG. 1, with the truck bed disclosed in phantom;

FIG. 3 is an enlarged, fragmentary section taken along the line 3—3 of FIG. 2;

FIG. 4 is a fragmentary section, similar to FIG. 3, of the bottom rear end portion of the truck bed liner, with the tailgate liner and tailgate disclosed in closed position;

FIG. 5 is a substantially enlarged, fragmentary section taken along the line 5—5 of FIG. 2;

FIG. 6 is an enlarged, fragmentary, exploded, perspective view of the upper left rear corner of the truck bed liner and the truck bed, and the fastener member therefor; and FIG. 7 is an enlarged, fragmentary section taken along the line 7—7 of FIG. 6, disclosing the liner fastened to the truck bed.

DESCRIPTION OF THE PREFERRED EMBODIMENT

Referring now to the drawings in more detail, FIG. 1 discloses a conventional pick-up truck 10, including a cab 11 and a truck bed or cargo compartment 12 supported upon wheels 13. The bed 12 includes a bottom wall 15 having elongated ribs 16, a front wall 17 and opposed side walls 18 and 19. A tailgate 20 is mounted upon a hinge pin 21 for swinging movement about a horizontal axis between the open position disclosed in FIG. 3 and the closed position disclosed in FIG. 4. The tailgate 20 may be further supported by the toggle link bar assemblies 23, disclosed in FIG. 1.

The truck bed liner 25 made in accordance with this invention includes a unitary molded body liner 26 and a unitary molded tailgate liner 27, each separately formed and unconnected, except through the hinge pin 21 between the truck bed 12 and the tailgate 20.

The truck body liner 26 includes a bottom wall 30, a front wall 31, and opposed side walls 32 and 33. All the walls 30, 31, 32 and 33 are integrally formed, such as by molding from plastic material. The plastic material used to mold both the body portion 26 and the tailgate liner 27 is preferably a durable, high-impact styrene sheet material, such as ABS (Acrylonitrile Butadiene Styrene) and more particularly made of ABS-LS plastic, which is a more durable acrylonitrile butadiene styrene sheet material including an additive or filler known in the trade as "LS". The plastic material is preferably 300 mils thick, and also preferably laminated or covered with a "KORAD" film to function as an ultra-violet ray inhibitor to prolong the life of the plastic material against the ultra-violet rays from the sun.

The walls 30, 31, 32 and 33 substantially conform to the interior surfaces of the corresponding bottom wall 15, front wall 17, and side walls 18 and 19 of the truck bed 12.

Each of the side walls 32 and 33 and the front wall 31 are provided with top flanges 35 projecting substantially horizontally outward in order to protect the upper surfaces of the corresponding side walls 18 and 19 and front wall 17 of the truck bed 12.

Although various types of fastening means may be employed to secure the truck bed body liner 26 to the truck bed 12, nevetheless one preferred form of toggle bolt fastener is disclosed in FIGS. 6 and 7 in the form of a threaded bolt 37 adapted to cooperate with an internally threaded collar 38 having expanding locking arms 39. As illustrated in FIGS. 6 and 7, the bolt 37 is inserted through a corresponding hole in the top flange 35 of either of the side walls 32 or 33 and is threadedly secured to the nut 38. As the body liner 26 is lowered into the truck bed 12, the expanded arms 39 are collapsed by engagement with the edges of the hole 40 the corresponding ledge 41 of the side walls 18 or 19. After the collapsed arms 39, nut 38 and bolt 37 have extended below and cleared the hole 40, the arms 39 are automatically expanded by springs, not shown, to their position disclosed in FIG. 7. The bolt 37 is then tightened within the nut 38 to securely hold the top flange 35 to the corresponding ledge 41 of the respective side walls 18 and 19 of the truck bed 12, as disclosed in FIG. 7.

In a preferred form of the invention, the bottom wall 30 of the body liner 26 is provided with uniformly and transversely spaced elongated ridge members 43 extending the entire length of the bottom wall 30, opening downward, and preferably opening forward to merge with the like ridge members 44 formed in the front wall 31 of the body liner 26.

Moreover, if the bottom liner wall 30 rests upon a bottom wall 15 is a truck bed 12 which has longitudinal rib members 16, each ridge member 43 is designed to have a slightly greater height and slightly greater width than a corresponding rib member 16 received by the ridge member 43, to provide ventilation space 45 between the ridge member 43 and the corresponding rib member 16, as best disclosed in FIGS. 2 and 3. If the bottom bed wall 15 is flat, then the ventilation space 45 is substantially greater.

This ventilation space 45 is essential for the elimination or minimization of condensation and moisture which otherwise might become trapped between closely-fitting, complementary liner ridge members and truck bed rib members.

For the same reason, a ventilation space 46 is provided between the front liner wall 31 and the front bed wall 17, as best disclosed in FIG. 3.

The tailgate liner 27 includes a central panel portion 48, having an elongated top portion merging into a top hook-shaped flange 49. The elongated bottom portion of the tailgate panel portion 48 merges into a bottom hook-shaped flange 50. Both of the hook-shaped flanges 49 and 50 project rearward from the central panel portion 48 and are adapted to extend over or across and then slightly behind corresponding top and bottom edge surfaces 51 and 52, respectively, of the tailgate 28, as best disclosed in FIG. 3. The hook-shaped flanges 49 and 50 are adapted to closely fit and receive the corresponding top and bottom surfaces 51 and 52 of the tailgate 20, so that when one of the hook-shaped flanges 49 or 50 has been fitted over the corresponding surface 51 or 52, the remaining or other hook-shaped flange 50 or 49 is manually forced, with a moderate degree of pressure, over its corresponding engaging surface 52 or 51, until the other flange is snap-fastened over the corresponding surface, to firmly hold the tailgate liner 27 securely in place to completely cover the interior surface of the rectangular-shaped tailgate 20.

The bottom edge surface 52 of the tailgate 20 is substantially a circular or cylindrical surface having its center of curvature substantially coinciding with the pivotal axis of the hinge 21, so that there will be a substantially close fit between the bottom surface 52 and the end surface 54 of the bottom wall 15 of the truck bed 12, regardless of the pivotal position of the tailgate 20. Thus, where the edge surface 52 is substantially circular, the corresponding hook-shaped flange 50 is also circular and extends through an arc of at least 90°. The extent of the arc of circular hook-shaped flange 50 greater than 90° is only enough to permit the flange 50 to be snapped over the arcuate edge surface 52 with a moderate amount of manually applied pressure, and yet firmly hold the tailgate liner 27 snugly upon the tailgate 20. The extent of the curvature of the bottom hook-shaped flange 50 will of course depend upon the resilience of the central panel portion 48, which in turn depends upon the elasticity of the plastic material, the wall thickness of the panel portion 48 and the rigidity of the central panel portion 48, which in turn depends upon its inherent reinforcing structure.

In a preferred form of the invention, the central panel portion 48 comprises a plurality of longitudinally spaced rib members 55 which extend transversely of the tailgate 20, or in other words are disposed vertically when the tailgate 20 is in an upright position, to improve the impact resistance of the tailgate liner 27 and to improve the strength and rigidity of the tailgate liner 27.

The central panel portion 48 is also preferably provided with an enlarged, lower rib member 56, preferably intersecting with the transverse rib members 55, and preferably having coplanar interior surfaces. The lower rib member 56 is preferably located to oppose, in close juxtaposition, the rear edge of the bottom liner wall 30, to minimize the space between the tailgate liner 27 and the bed body liner 26, to prevent small articles from leaking or falling from the truck bed 12, when the tailgate 20 is in closed position, as disclosed in FIG. 4.

Moreover, the lower rib member 56 provides an elongated stop or buffer in the lower rear end of the body liner 26, where impact from objects within the truck bed 12 are most likely to occur.

The body liner 26 may be provided with slight drafts in the side walls 32 and 33 and the front wall 31, relative to the bottom wall 30, to permit nesting or stacking of a plurality of the body liners 26, in order to economize space in storage or shipment of the body liners 26.

Furthermore, the plastic material from which the body liner 26 and tailgate liner 27 are made, may have appropriate pigments or coloring material added in order to enhance the appearance of the liners 26 and 27.

In the preferred form of the invention, the liners 26 and 27 are preferably vacuum-formed from the ABS-LS plastic sheet material.

What is claimed is:

1. A protective liner for a truck bed having a bottom wall, a front wall, and opposed side walls, said bottom wall comprising a plurality of transversely spaced longitudinal rib members extending front-to-rear of the truck bed, comprising:
 (a) bottom liner wall adapted to rest upon and to cover the bottom wall of said truck bed,
 (b) said bottom liner wall comprising transversely spaced, front-to-rear extending, raised, ridge members opening downward,
 (c) there being one ridge member for each rib member, each ridge member being in substantial longitudinal alignment with each corresponding rib member,
 (d) the width of each ridge member being greater than the width of the corresponding longitudinally aligned rib member to provide longitudinal ventilating spaces between said ridge members and the bottom wall of said truck bed when said bottom liner wall covers said bottom wall.

2. The invention according to claim 1 in which the height of each ridge member is slightly greater than the height of its corresponding covered rib member to provide an elongated upper ventilating space between the top of said rib member and its corresponding ridge member.

3. The invention according to claim 2 in which all of said ventilating spaces between the corresponding ridge members and rib members extend substantially the full length of said truck bed liner.

4. The invention according to claim 1 in which said truck bed liner further comprises a front liner wall and opposite side liner walls connected to said bottom wall, said front and side liner walls being adapted to fit against the interior surfaces of the corresponding front and opposing side walls of the truck bed.

5. The invention according to claim 4 in which said front liner wall comprises a plurality of transversely spaced, vertically extending, front ridge members to create vertical ventilating channels between said front ridge members and the front wall of said truck bed.

6. The invention according to claim 5 in which said front ridge members are in fluid communication with corresponding ridge members in said bottom liner wall.

* * * * *